June 15, 1948.  G. T. BACKE, JR  2,443,219
TIRE SKID CHAIN
Filed June 2, 1947  2 Sheets-Sheet 1
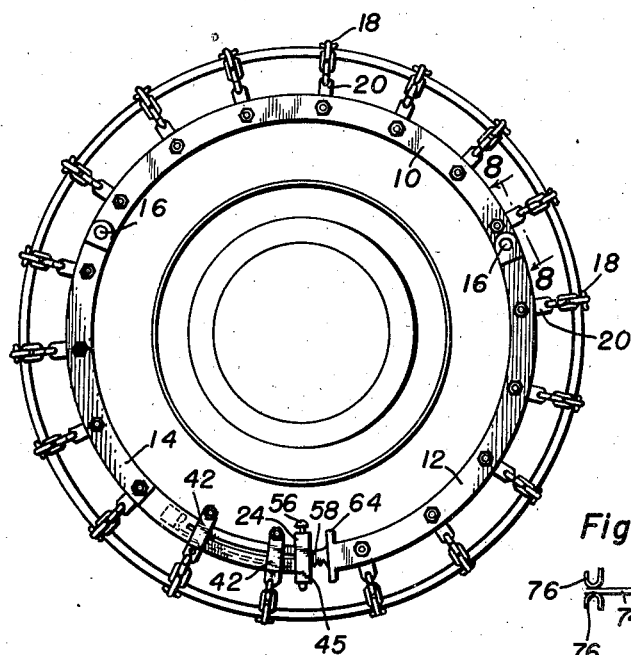
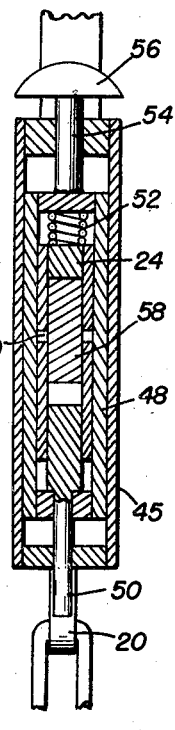
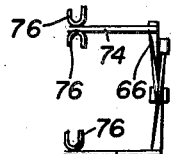
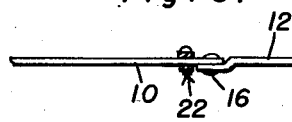
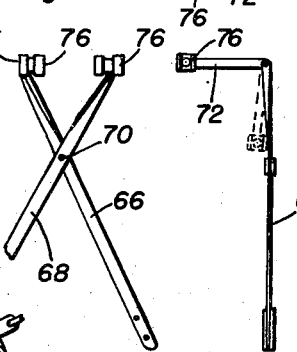
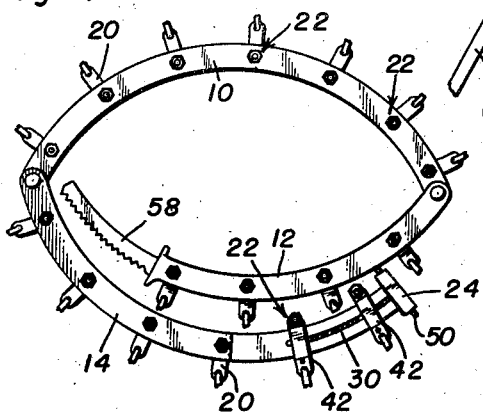
Inventor
George Thomas Backe, Jr.
By Clarence A. O'Brien
and Harvey B. Jacobson
Attorneys

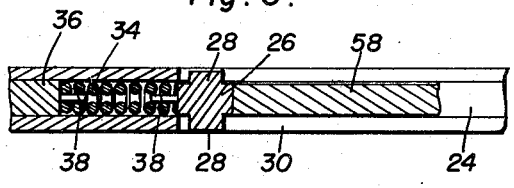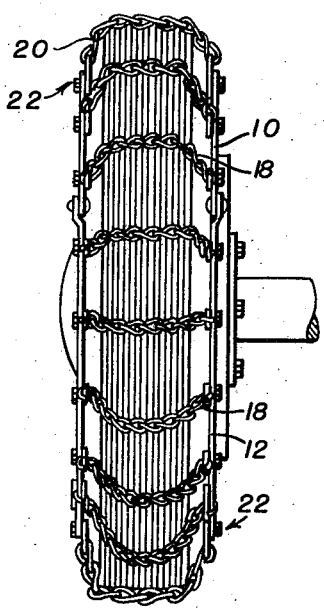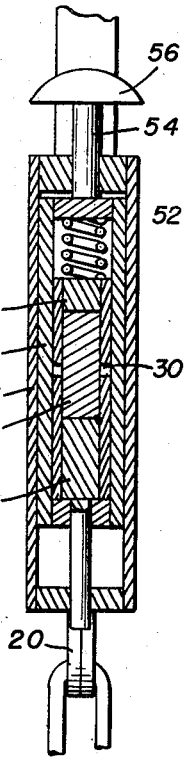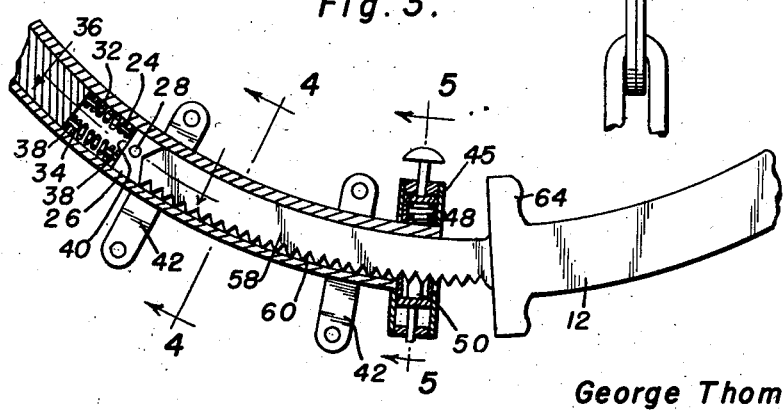

Patented June 15, 1948

2,443,219

UNITED STATES PATENT OFFICE 2,443,219

TIRE SKID CHAIN

George Thomas Backe, Jr., Jersey City, N. J.

Application June 2, 1947, Serial No. 751,896

6 Claims. (Cl. 152—241)

This invention appertains to novel and useful improvements in tire anti-skid devices and means for conveniently, resiliently and easily attaching and detaching the same to a tire.

An object of this invention is to provide a collapsible anti-skid device having improved means for latching the same in the operative, usual position about the periphery of a conventional tire.

Another object of this invention is to provide improved, resiliently biased latch means cooperable with an arcuate locking means.

A further object of this invention is to provide means for resiliently resisting penetration of said last-mentioned means in a housing provided for retaining said resiliently biased latch means.

Another purpose of this invention is to provide means for guiding said last-mentioned resilient resistance means in a predetermined, prescribed arcuate travel.

Another object of this invention is to provide a device of the character to be subsequently set forth which is commercially feasible, lending itself well to common shop practices.

Other objects and features of novelty will be specifically pointed out or will become apparent to those skilled in the art, in following the description of the preferred embodiment of the present invention, illustrated in the accompanying drawings, wherein:

Figure 1 is an elevational side view of the preferred form of the present invention, showing the same in use with a conventional tire;

Figure 2 is an elevational front view of the invention disclosed in Figure 1;

Figure 3 is an enlarged sectional view of the latch means forming part of the present invention;

Figure 4 is a transverse sectional view disclosing details of construction and taken substantially on the line 4—4 of Figure 3 and in the direction of the arrows;

Figure 5 is a transverse sectional view of the invention disclosed in Figure 3 and taken substantially on the line 5—5 thereof and in the direction of the arrows;

Figure 6 is a longitudinal sectional view disclosing certain details of construction taken substantially on the line 6—6 of Figure 3 and in the direction of the arrows;

Figure 7 is an elevational side view of the invention disclosed in Figure 1 showing the same in the collapsed form;

Figure 8 is a sectional view disclosing the preferred method of securing sectional elements of the invention and conventional cross link members thereto;

Figure 9 is a sectional view similar to Figure 5 showing certain elements in a second position of operation;

Figure 10 is a plan view of a tool especially designed for use with the present invention;

Figure 11 is an elevational side view of the tool shown in Figure 10; and

Figure 12 is a side view of the tool disclosed in Figure 11.

Referring now in detail to the illustrated, preferred embodiment of the present invention, like reference characters are used throughout to indicate similar elements.

This invention has been developed to provide a device for dextrously and very easily attaching and detaching skid chains or other anti-skid devices to a conventional tire. The invention resides primarily in the pivotal arrangement of a plurality of bands having chain means extending across in sets or pairs thereof. Also forming an important part of the present invention is the improved latch means for retaining said bands in the predetermined, fixed, operative position.

The discomfort involved in applying and removing conventional skid chains from automotive vehicles is well known to all persons having been faced with such a problem. This is especially true if this operation must be performed under adverse conditions such as when a vehicle is seemingly immovably entrenched in a large quantity of snow or perhaps in marshy or muddy ground. The usual conventional skid chain means requires that a person pull, urge and manipulate locking means to the person's great discomfort and dissatisfaction. In the present invention, all that is required for retaining the skid chain device in the operative position is to insert a single member into a second receiving means. This operation is repeated twice, once to latch the outer wheel surface components and the second time to obviously latch the inner wheel surface components.

As is seen clearly from an inspection of Figure 2, two sets of arcuate bands are provided which are identical in character. Cross links extend from one set of bands to the other set and it is these cross links which engage the outer periphery of a conventional tire. Since these sets of bands are identical in construction, only one set will be described in detail, as this will, of necessity, lead to an understanding of the other set. A number of bands 10, 12 and 14 is provided of any suitable material, preferably metallic, and are arcuate in configuration.

The aforementioned bands 10, 12 and 14 are provided with apertures at selected terminal portions and conventional pivot pins 16 extend therethrough. These pivot pins may be in the form of rivets if so desired in order to facilitate manufacture. Chain means 18 having straps 20 at the terminal portions thereof is provided at selected, predetermined positions about said bands. These straps 20 have apertures therethrough for receiving detachable securing means therethrough. The preferable detachable securing means is a conventional bolt and nut construction, generally indicated at 22.

The improved locking means forming an important part of the present invention may be viewed particularly well in Figure 3. This locking means consists primarily of a housing 24 having a shoe 26 slidably received therein. This shoe is provided with diametrically opposite lugs 28 extending from the sides thereof and engageable with suitable slots 30 in the side walls of said housing 24. Means for resiliently biasing the said shoe 26 outwardly of said housing 24 is provided. This means is preferably a plurality of springs 32 and 34, respectively, seated on a selected wall 36 of the housing 24 and upon a selected face of the shoe 26. Lugs 38 may be provided on the said walls 36 and selected wall of the shoe 40 for engaging the space between the coils of the springs 32 and 34, respectively. Obviously, these lugs may be utilized for frictionally engaging the innermost portions of the coils, thereby holding said springs in the desired relative positions.

It is noted at this point that, due to the construction of the said housing 24, the said straps 20 must be formed as clamps 42 for encircling the housing 24. These clamps 42 are provided with the bolt and nut construction 22 for retaining the same in the proper fixed position.

Latch means is provided in association with the said housing 24. This latch means forms an important part of the present invention and will be described in detail at this time. A housing or cage 45 is rigidly secured to the said housing 24 and cooperable with the bore thereof by the medium of a suitable slot provided in said housing 24. A sleeve member 48 is slidably received in the cage 45 and a latch keeper 50 is rigidly secured thereto. This latch keeper projects through a selected wall of the cage 45 and extends within the sleeve-like member 48. Means for resiliently biasing the sleeve-like member 48 relative to the housing 24 is provided. This means is preferably a coil spring 52 interposed between the said housing 24 and a selected wall of the sleeve-like member 48. As described above, the latch keeper rod 50 is secured to said sleeve-like member 48, and accordingly, when the last-mentioned member 48 is moved relative to the housing 24, it follows that the latch-keeping means 50 will also be moved. Actuating means, preferably in the form of a rod 54, is secured to the said sleeve-like member 48 and projects through the cage 45. A suitable actuating handle or knob 56 may be secured to the rod 54 for obvious actuating purposes.

Secured to a selected band 12 is an extension 58 having gear teeth 60 thereon. These gear teeth, along with the extension, are arcuate in configuration, in order to be complemental to the general curvature of the housing 24. As is quite apparent from an inspection of Figure 3, the said extension 58 is slidably received within the said housing 24, while the latch keeper means 50 simply engages selected teeth thereof. It is also apparent from this figure that the means for impeding entry into the housing is also actuated. This means is obviously the shoe 26 and its associated spring mechanism. By utility of this last-mentioned structure, upon releasing the latch means 50 from engagement with the teeth 60, the extension 58 will be ejected from the housing 24.

It will be noted from a careful inspection of Figure 1 that protuberances 64 are provided adjacent the extension 58. These protuberances are adapted to be engaged by a particularly designed tool in actuation of the locking means. This tool also engages a selected element such as the cage 45 or a selected strap 42. Any conventional tool may be utilized for locking the invention securely to a wheel. However, this invention has been carried a step further in developing a particularly meritorious tool for use herewith. This tool is disclosed in Figures 10 through 12, respectively.

A pair of scissors-like arms 66 and 68, respectively, are pivoted at a selected point thereof by utility of a conventional pivot pin 70. Extensions 72 and 74, respectively, are pivoted to the terminal portions of the said scissors-like arms or rods 66 and 68. Then, pairs of oppositely facing, U-shaped members 76 are received on the terminal portions of said extensions 72 and 74. These U-shaped members are engageable with said protuberances 64 and the said cage 45 or, if desired, the clamp 42. It will be noted by the construction of the tool that it may be easily and conveniently folded at the pivot points for storage in relatively confined areas such as is usually found in the luggage compartments of automotive vehicles. Also, by utility of the pivoted extensions 72 and 74, the innermost locking means of each tire may be more easily reached and consequently easier to manipulate.

While there has been described and illustrated but a single preferred embodiment of the present invention, it is apparent that various changes including omissions and additions may be made herein without departing from the spirit of the invention. Accordingly, limitation is sought only in accordance with the scope of the following claims.

Having described the invention, what is claimed as new is:

1. A tire anti-skid device comprising sets of a plurality of arcuate bands, pivot means received in selected terminal portions of said bands, chain means extending across said sets of bands, adjustable latch means associated with selected terminal portions of said bands, said adjustable latch means including a housing associated with a selected band, a reduced extension having teeth thereon projected from a second selected band and means secured to said housing for engaging selected teeth of said extension, said last-mentioned means comprising a cage secured to said housing, an insert slidably received in said cage, a keeper secured to said insert, means for resiliently biasing said insert positioned within said cage.

2. In a readily attachable anti-skid device, sets of mutually pivoted links, chain means secured across said sets of links, adjustable resiliently biased latch means associated with selected links, said latch means comprising a cage, a sleeve received in said cage, means for resiliently urging said sleeve and a lug secured to said sleeve.

3. In a readily attachable anti-skid device, sets of mutually pivoted links, chain means detachably secured across said sets of links, adjustable resiliently biased latch means associated with selected links, said latch means comprising a cage, a sleeve received in said cage, means for resiliently urging said sleeve and a lug secured to said sleeve, extension means on a selected link comprising an arcuate rod having gear teeth thereon engageable with said lug.

4. In a readily attachable anti-skid device, sets of mutually pivoted links, chain means detachably secured across said sets of links, adjustable resiliently biased latch means associated with selected links, said latch means including a housing secured to a selected link, resiliently biased latch keeper means secured to said housing, extension means on a second selected link slidably received in said housing and engageable with said latch keeper means, and means for resiliently resisting penetration of said extension means in said housing, said last-mentioned means comprising a shoe in said housing, means for restricting the travel of said shoe and spring means for resiliently biasing said shoe outwardly of said housing.

5. In a readily attachable anti-skid device, sets of mutually pivoted links, chain means detachably secured across said sets of links, adjustable resiliently biased latch means associated with selected links, said latch keeper means comprising a cage, a sleeve received in said cage, means for resiliently urging said sleeve and a lug secured to said sleeve, said extension means comprising an arcuate rod having gear teeth thereon engageable with said lug, a shoe slidably received in said housing, spring means engaging said shoe and a selected wall of said housing, slots in said housing, means secured to said shoe engageable with said slots for directing the travel of said shoe.

6. The combination of claim 2 and means on a selected link lockingly engageable with said lug in selected position, thereby selectively adjusting the effective diameter of said sets of mutually pivoted links.

GEORGE THOMAS BACKE, Jr.

REFERENCES CITED

The following references are of record in the file of this patent:

UNITED STATES PATENTS

| Number | Name | Date |
| --- | --- | --- |
| 1,311,048 | Cramer | July 22, 1919 |
| 1,627,776 | Haumerson | May 10, 1927 |
| 1,733,871 | Frank | Oct. 29, 1929 |
| 1,801,159 | Hunter | Apr. 14, 1931 |